United States Patent [19]

Cozine et al.

[11] 4,153,436

[45] May 8, 1979

[54] AIR TUBULATOR ON ROTARY SCREEN

[75] Inventors: Mark L. Cozine, East Earl; John J. Komancheck; John D. Riffanacht, both of New Holland, all of Pa.

[73] Assignee: Sperry Rand Corporation, New Holland, Pa.

[21] Appl. No.: 889,624

[22] Filed: Mar. 24, 1978

[51] Int. Cl.² ............................................ B01D 46/26
[52] U.S. Cl. ...................................... 55/290; 55/269; 55/400
[58] Field of Search ........................... 55/290, 400, 269

[56] References Cited

U.S. PATENT DOCUMENTS

| 1,349,142 | 8/1920 | Williams et al. ...................... 55/290 |
| 3,475,883 | 11/1969 | Sullivan ................................. 55/290 |
| 3,816,981 | 6/1974 | Carnewal et al. ..................... 55/290 |

*Primary Examiner*—Bernard Nozick
*Attorney, Agent, or Firm*—C. Hercus Just

[57] ABSTRACT

Means to tend to dislodge extraneous material from a screen mounted adjacent a cooling radiator for an internal combustion engine such as employed in a grain harvesting combine which develops chaff and dust normally tending to clog said screen, said means comprising one or a plurality of blades extending radially from a cylindrical screen supported for rotation adjacent said cooling radiator and driven by auxiliary means derived from said internal combustion engine.

5 Claims, 2 Drawing Figures

AIR TUBULATOR ON ROTARY SCREEN

BACKGROUND OF THE INVENTION

In the operation of various machines in which the ambient atmosphere is very dusty oor contains a substantial amount of other extraneous material, problems arise, particularly in regard to operating the machines in a manner to render them free from obstruction in various ways from said dust and extraneous material. For example, internal combustion engines frequently are water-cooled and the temperature is maintained operative by the use of radiators through which ambient air is drawn by means of suitable fans to reduce the temperature of the cooling water for the engine. Further, if the radiator is fo the type having a multitude of passages therethrough, said passages can be clogged by said dust and extraneous material and thereby greatly decrease the efficiency of the cooling capacity of the radiator, to such extent that the engine wall or can become overheated.

The foregoing situation is particularly prevelant in agricultural equipment in which the same is driven by water-cooled internal combustion engines that employ fin type radiators to maintain the temperature of the cooling water at an operative level. A fan normally is utilized to draw cooling air through the radiator but under circumstances where a substantial amount of dust or extraneous material, such as chaff and the like, is present in the atmosphere, the spaces between the fins and tubes of the radiator are capable of becoming clogged with such material and thereby minimize the cooling capacity and cause overheating of such internal combustion engines.

Efforts to obviate the aforementioned difficulties have been developed heretofore by utilizing rotary screens of different types which are driven at desired speeds and are located adjacent the inlet to the cooling radiator for the engine and various means have been utilized to render such screens free from any appreciable amount of clogging by said dust or extraneous material, such as chaff.

The following patents represent certain of the efforts to remove the dust from such screens:

U.S. Pat. No. 395,801 to Weeks, dated Jan. 8, 1889, shows a dust collector in which a cylindrical screen B around which an endless apron or dust-collecting surface C passes for support thereby. A plurality of balls or other forms of loose bodies N are disposed within the screen and function during the operation thereof to attempt to loosen the dust from the apron as it moves around said screen B.

U.S. Pat. No. 956,862 to Meyer, dated May 3, 1910, shows a vacuum dust remover in which a cylindrical filter screen formed from flannel in which the minute fibers thereof serve to hold the particles of dust away from closer contact with the pores of the filter, and thereby, are intended to insure a free passage of air through the body of the filter.

U.S. Pat. No. 1,124,574 to Zimmer, dated Jan. 12, 1915 and subsequent U.S. Pat. No. 1,176,721 to Zimmer, dated Mar. 21, 1916, show what are stated to be self-cleaning bags for vacuum cleaners in which the bags are stretched between vertically spaced members in which the lower member is supported by vertically extending spring means which are arranged so that slight pulsations transmitted through the conduit from the pump will have a tendency to continuously vibrate the coil springs and thereby agitate the filter surface to tend to induce the material filtered from the air to fall therefrom.

The present invention has been developed to employ means different from those which are disclosed in the aforementioned patents for purposes of loosening and removing any dust or extraneous chaff material and the like from a rotating filter screen associated with the radiator of an internal combustion engine, details of which are set forth below.

SUMMARY OF THE INVENTION

It is the principal purpose of the present invention to provide upon a filter screen rotated about an axis adjacent a radiator for an internal combustion engine and especially an internal combustion engine employed to operate threshing equipment such as combines and the like, projecting elements which rotate with the screen and have been found to provide a distinct tendency to agitate the air immediately adjacent said rotating screen in a manner to loosen and separate any dust or extraneous material such as chaff and the like which otherwise has a tendency to accumulate upon the outer surface of said screen, whereby when areas of the screen successively pass through the lower part of the path described by the movement of the screen, gravity will assist in permitting such material to fall from the screen, particularly when this operation is facilitated by employing a shield operable within the screen adjacent the lowermost segmental portion of the screen and in which position the shield is supported by gravity in said operative position or the same may be fixed stationarily in such position, if desired.

It is another object of the invention to provide the means for effecting such turbulence in the air in the form of at least one, and preferably a plurality of radially extending blades fixed to the exterior of the screen and when said screen is cylindrical, said blades are parallel to the axis thereof and are circumferentially spaced around the screen in substantially even manner.

The aforementioned means to effect turbulence in the air adjacent said screen, such as by forming eddy currents therein are referred to as a "turbulator", both in the title and the specification and claims of the application, as a generic term describing the overall nature of the invention.

Details of the foregoing objects and of the invention, as well as other objects thereof, are set forth in the following specification, and illustrated in the accompanying drawings comprising a part thereof.

DETAILED DESCRIPTION

Figure 2:
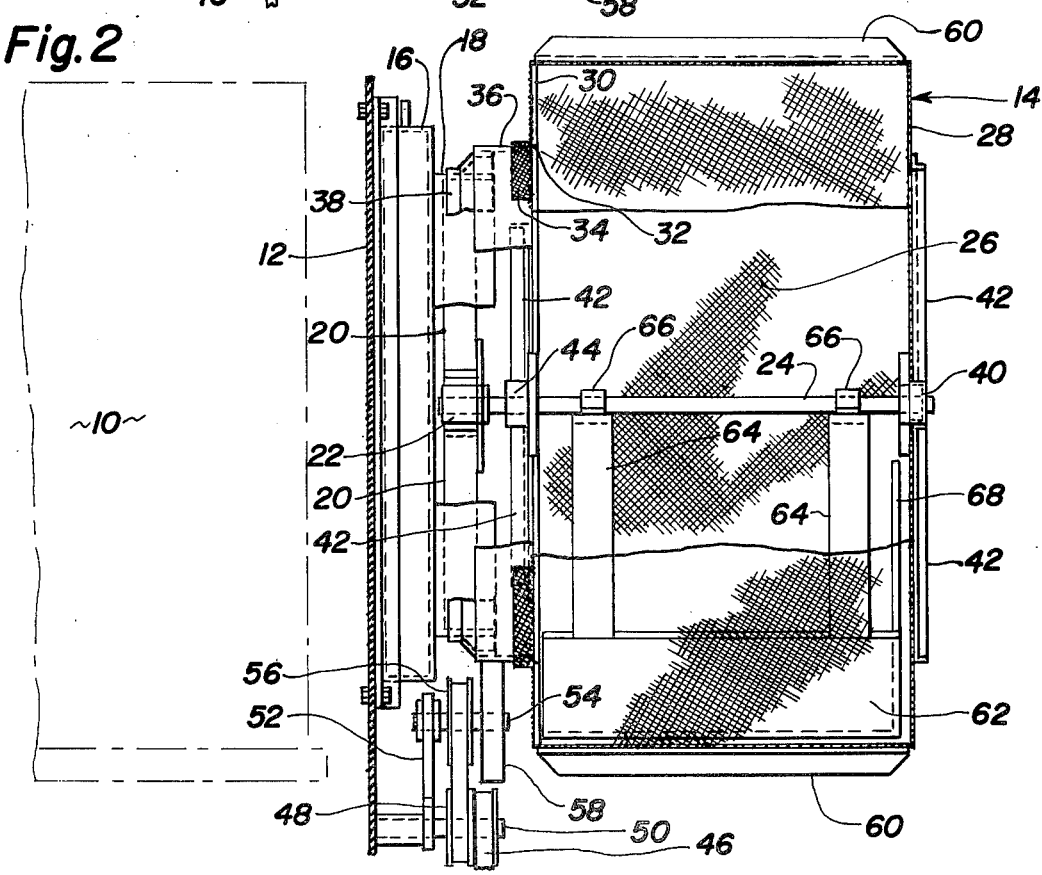
FIG. 2 is a side elevation of the structure shown in FIG. 1, part of the screen being broken away to illustrate details of mechanism within the screen and also showing a vertical section a supporting plate comprising part of the housing of the threshing equipment to which the invention is applicable.

Referring to the drawings, an exemplary internal combustion engine 10 is shown in FIG. 2, outlined in phantom. Especially in heavy duty harvesting machines, such as combines, the engine normally is of the diesel type. The same is located at a suitable position within the harvesting machine and a plate 12, a part of the housing surrounding said engine, is shown in said figure, said portion supporting a rotatable screen 14. An appropriate rectangular or square frame 16 is suitably supported by the plate 12, said frame having a circular opening therein which is surrounded by a cylindrical flange 18. Extending radially from the inner surface of the flange 18 are a plurality of radial arms which are rigidly fixed thereto, the inner ends of said arms all being connected to a fixed boss 22 which forms the sole support for a cantilever type horizontal shaft 24 upon which the screen 14 is supported for rotation.

The screen 14 has a cylindrical outer wall 26 of desired strength, especially appropriate rigidity, the mesh of the screen also being selected to withhold from passage therethrough sizes of extraneous material, such as chaff and the like, which is typical of such material found in the ambient atmosphere adjacent a threshing operation, regardless of whether the threshing equipment is stationary or portable. The outer end 28 of the screen is formed from similar mesh material as the cylindrical outer wall thereof and the outer end is disk-like in shape and the periphery thereof is suitably fixedly connected to the outermost edge of the cylindrical outer wall 26 of the screen by suitable means such as soldering, welding or otherwise. Likewise, the inner wall or face 30 of screen 14 is formed from the same type of mesh material as the outer end 28 and cylindrical wall 26 but instead of being a disk, the inner face or wall 30 is a flat annulus having a circular opening 32, which is suitably affixed to a circular screen flange 34 fixed to the circular opening 32 of the inner wall 30, the screen flange 34 surrounding a circular drive flange 36, which is fixedly connected to the screen flange 34 so as to be unitary therewith. The flange 36 is of a larger diameter than the cylindrical flange 18 on the frame 16 but is coaxial therewith and a rubber seal or gasket 38 which surrounds the stationary cylindrical flange 18 is appropriately connected to the outer edge of drive flange 36 for rotation therewith in sliding relationship with respect to the stationary cylindrical flange 18 and thereby provides an appropriate seal between the screen 14 and the housing which contains the engine 10.

For purposes of rigidifying the outer end 28 of screen 14 and also to support a bearing 40 for rotation around the outer end of shaft 24, a plurality of angle members 42 are appropriately connected thereto, such as by soldering or welding, said angles extending from the periphery of the outer end 28 to the central bearing 40 which is mounted upon the outer end portion of the shaft 24 as aforesaid. Likewise, the inner end of the screen 14 is provided with a plurality of radial arms 42 which, for example, if desired, may be angles similar to the angles 42, the same extending toward the axis of the screen and being connected to an inner bearing 44, rotatable upon the inner end of shaft 24 and thereby supporting the inner end of the screen 14 for rotation.

Figure 1:
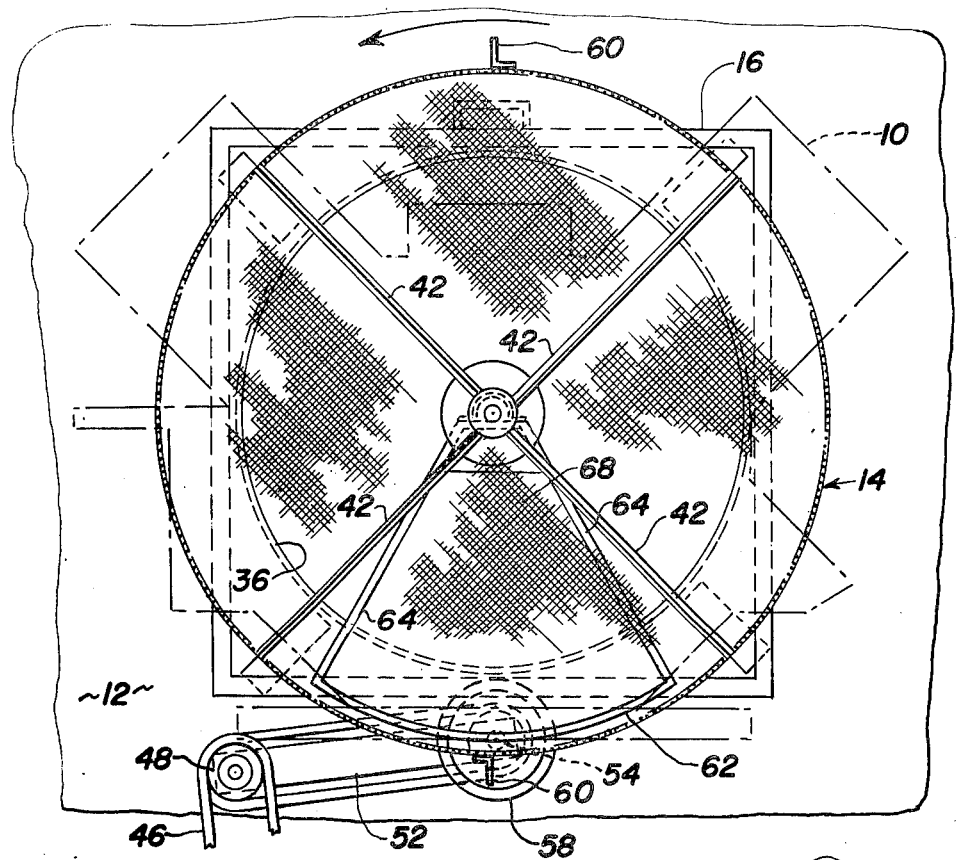
FIG. 1 is a vertical elevation of a rotatable screen associated with a water-cooling radiator for an internal combustion engine, such as employed in harvesting equipment and illustrating a preferred form of elements embodying the invention by which agitation of air adjacent the surface of said screen and in the vicinity of said elements is achieved in an effective manner, said figure also showing an exemplary drive means by which the screen is rotated and an air shield disposed in the lower portion of the screen.

Screen 14 is rotated by a series of belts, one of which comprises belt 46 that is connected appropriately to a driving sheave or pulley connected by conventional means to the engine 10 and driven thereby. The sheave around which belt 46 extends is common with a second sheave 48, said sheave being rotatable about a stub shaft 50 upon which a short arm 52 also is supported at one end for purposes of supporting at its outer end another short shaft 54 upon which a driven sheave 56 is fixedly mounted, together with a drive roller 58 which frictionally engages the outer surface of circular drive flange 36, as clearly shown in FIGS. 1 and 2.

As indicated hereinabove, the principal object of the present invention is to provide means by which dust and/or other type of larger size extraneous material, such as chaff and the like, is loosened and removed from the surfaces of the various mesh elements comprising screen 14, particularly the cylindrical outer wall 26 thereof, in order that air may continue to pass freely through the mesh of the screen and thus, be drawn through the opening which is surrounded by the cylindrical flange 18 for passage through a radiator, for example, and from there to the engine 10. The preferred means for achieving this comprises a turbulator arrangement, defined hereinabove, which in the preferred embodiment, comprises at least one, and preferably a plurality, of radially extending flanges or blades 60, two of which are illustrated in exemplary manner in the figures of the drawings. These, for example, may comprise angle members having one flange appropriately affixed to the cylindrical outer wall 26 of the screen 14, and it has been found that when the screen is rotated particularly at certain speeds, there is a tendency for eddy currents or similar turbulence to be effected in the air around the outer circumference of the screen in such manner that any extraneous material tending to adhere to said surface or "dancing" around said surface, as has been found to occur in normal operations of such screens without any means to effect turbulence, whereby the material is maintained or caused to be relatively loose, so that when the cylindrical outer wall 26 of the screen passes through the lower portion of its path during operation, such loosened material may fall by gravity from the outer surface of the screen due to the utilization of an arcuate shield or baffle 62 which is supported, for example, by several pairs of radially disposed arms 64, the upper ends of which have bearings 66, which are rotatable upon the fixed shaft 24. The arcuate shield 62 also has a radially extending segmental portion 68 which further renders the shielding effect more efficient.

From the foregoing, it will be seen that the present invention provides relatively simple but highly effective means to maintain the rotatable filtering screen for use in connection with an internal combustion engine to render the cooling effect of a radiator relatively free from accumulated dust and other extrateous material and thereby facilitate the operation of the engine.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A rotary tubular screen of mesh material operable to prevent the passage of extraneous ambient matter and otherwise operable with a cooling air intake for an internal combustion engine comprising support means having an opening therethrough and supporting a shaft and adapted to be mounted adjacent a radiator for an internal combustion engine and a suction fan associated therewith to draw cooling atmospheric air through said radiator, a screen which is circular in cross-section, means to mount said screen on said support at said opening for rotary motion, said screen being closed at the opposite end by mesh material, a shaft mounted centrally within said screen, and an arcuate baffle freely suspended with said screen from said shaft, auxiliary drive means engaged with said screen to rotate the same about an axis extending outward from a radiator of an internal combustion engine, and seal means between said screen and said support means; the improvement in combination with said screen comprising longitudinally extending vane means projecting outwardly from the circumference of said screen and operable to produce turbulence in the air surrounding said screen when the same is rotated by generating eddy currents adjacent said screen to prevent extraneous ambient matter extending the operation of the engine to adhere upon said screen.

2. The air tubulator according to claim 1 in which said vane comprising said turbulating means is in parallelism with the axis of rotation of said screen and movable therewith to produce currents which tend to lift said extraneous ambient material from said screen and thereby facilitate the removal thereof from the screen during rotation thereof.

3. The air tubulator according to claim 2 in which said vane means on said screen extends substantially radially therefrom.

4. The air tubulator according to claim 1 in which said tubular screen has a substantially cylindrical screen wall which is connected at the periphery thereof to said mesh material which closes said opposite end of the tubular screen and said vane means projecting therefrom comprises a substantially radially extending blade fixed to said screen wall and rotatable therewith.

5. The air tubulator according to claim 4 in which a plurality of said radially extending blades are affixed to said cylindrical screen wall in circumferentially spaced relationship and extend axially substantially for the full width of said cylindrical screen wall.

* * * * *